No. 772,814. PATENTED OCT. 18, 1904.
T. MIDGLEY.
METALLIC WHEEL SPOKE.
APPLICATION FILED AUG. 24, 1903. RENEWED APR. 13, 1904.
NO MODEL. 2 SHEETS—SHEET 1.
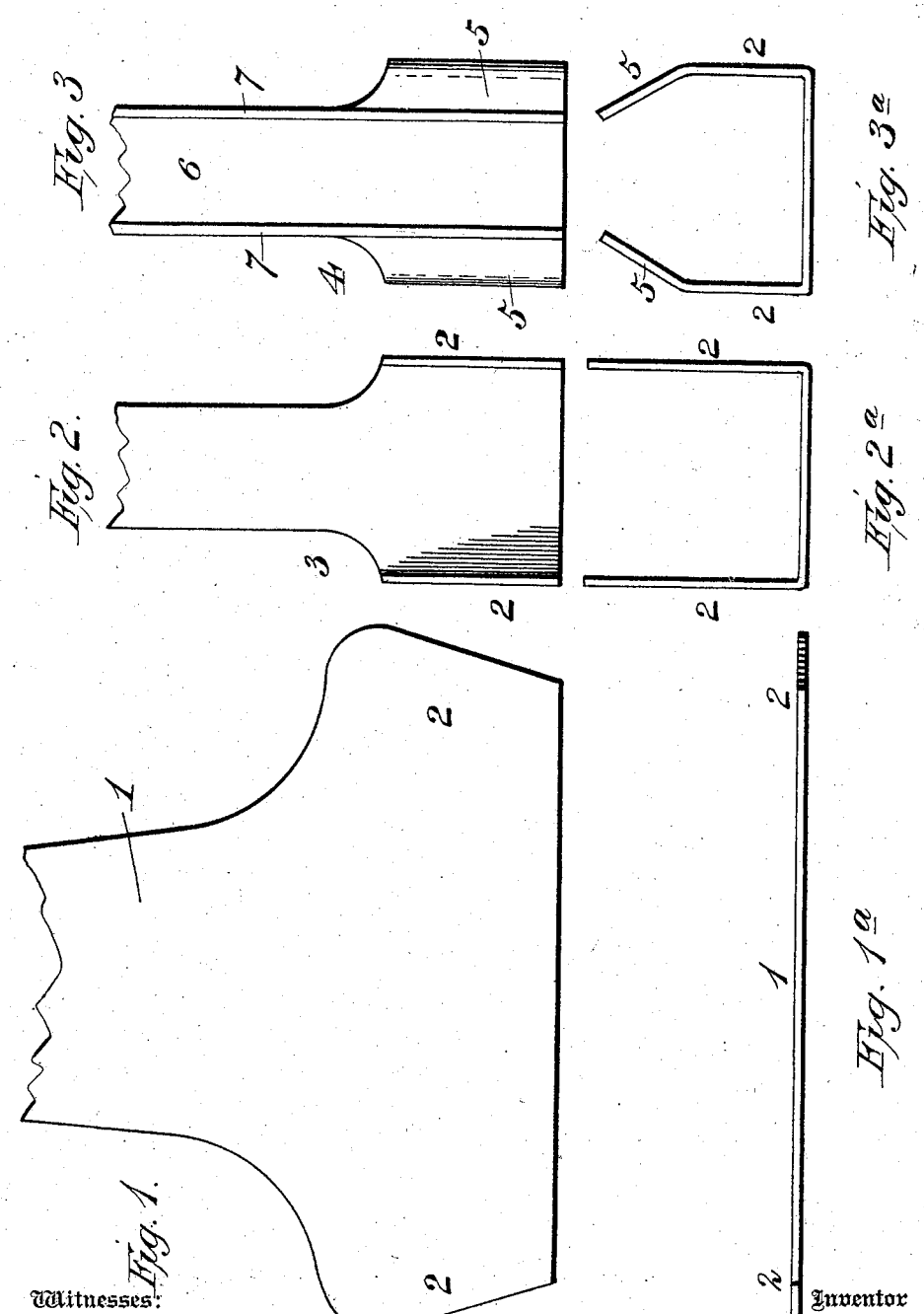

No. 772,814. PATENTED OCT. 18, 1904.
T. MIDGLEY.
METALLIC WHEEL SPOKE.
APPLICATION FILED AUG. 24, 1903. RENEWED APR. 13, 1904.
NO MODEL. 2 SHEETS—SHEET 2.
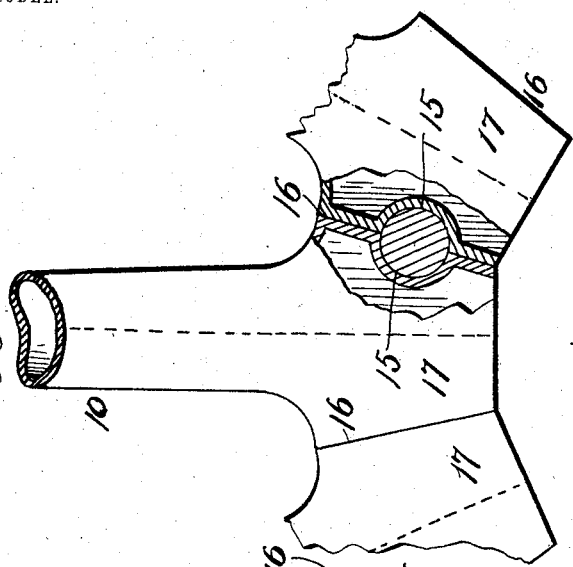
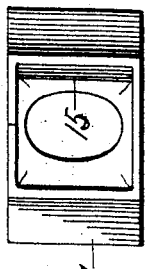
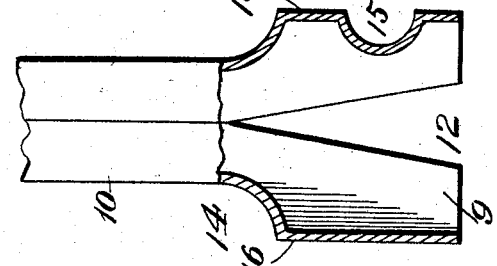
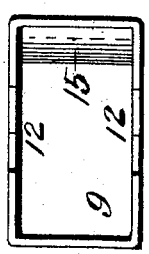
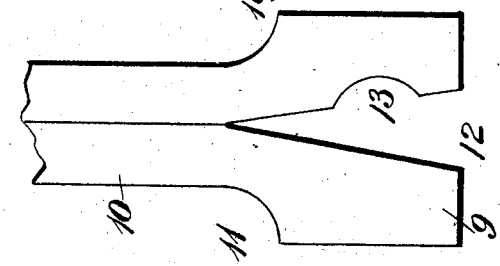
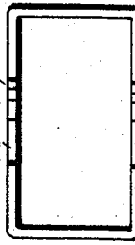
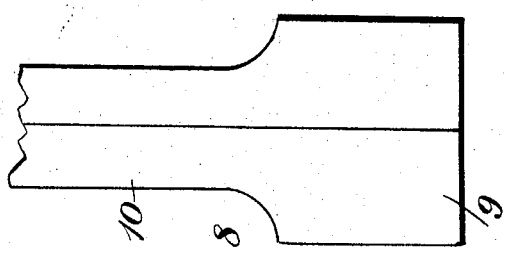
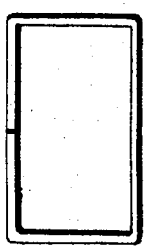
Witnesses: Inventor
F. L. Ourand. Thomas Midgley.
W. Parker Reindel. By his Attorney
D. L. Reindel.

No. 772,814. Patented October 18, 1904.

UNITED STATES PATENT OFFICE.

THOMAS MIDGLEY, OF COLUMBUS, OHIO, ASSIGNOR TO THE MIDGLEY MANUFACTURING COMPANY, OF COLUMBUS, OHIO, A CORPORATION OF OHIO.

METALLIC WHEEL-SPOKE.

SPECIFICATION forming part of Letters Patent No. 772,814, dated October 18, 1904.

Application filed August 24, 1903. Renewed April 13, 1904. Serial No. 203,036. (No model.)

*To all whom it may concern:*

Be it known that I, THOMAS MIDGLEY, a citizen of the United States, residing at Columbus, in the county of Franklin and State of Ohio, have invented certain new and useful Improvements in Metallic Wheel-Spokes; and I do hereby declare the following to be a full, clear, and exact description of the invention, such as will enable others skilled in the art to which it appertains to make and use the same.

My invention relates to metallic wheel-spokes, has for its object the production of a spoke which may be used for locomobiles, automobiles, and vehicles in general, and consists in certain improvements in construction, which will be fully disclosed in the following specification and claims.

In the construction of wheels for vehicles the general practice is to secure each spoke in the hub of a wheel by a bolt which passes through the spoke, and in the spokes shown in my Patent No. 713,786, granted November 18, 1902, on which spoke the present spoke is an improvement, a transverse reinforce is used in the head of the spoke to stiffen it and a thimble is inserted in the hub-plates and passes through the opening in the reinforce in each spoke. In the present construction the metal is bent in on one side of the spoke-head to form a transverse semicylindrical seat for a bolt, and each two adjacent spokes arranged in pairs in the wheel are secured in the hub by one bolt, and the metal which has been forced down in the side of the spoke-head forms a reinforce for the spoke.

In the accompanying drawings, which form part of this specification, Figure 1 represents a plan view of a blank from which a spoke is made; Fig. 1ª, an end view of the same; Fig. 2, a plan view of the blank after the first operation of bending the blank; Fig. 2ª, an end view of the same; Fig. 3, a plan view of the blank after the second operation; Fig. 3ª, an end view of the same; Fig. 4, a plan view of the blank after the third operation; Fig. 4ª, an end view of the same; Fig. 5, a plan view of the blank after the fourth operation; Fig. 5ª, an end view of the same; Fig. 6, a plan view, partly in section, of the blank after the fifth operation; Fig. 6ª, an end view of the same; Fig. 7, a side elevation, partly in section, showing several spokes assembled as they appear in the hub of a wheel; and Fig. 7ª, an end view of a completed spoke.

Reference being had to the drawings and the designating characters thereon, 1 indicates the spoke-blank in its initial form cut from a sheet of steel and is extended laterally at 2 2 to form the walls of the head of the spoke. 3 indicates the blank after the first operation of bending to form a spoke, which is done in a suitable die for the purpose, as all the subsequent steps or stages in the operation are performed. In this blank the extensions 2 2 have been turned up vertically to form three of the walls of the spoke-head. 4 indicates the blank after the second operation and in which the outer ends 5 5 of the extension 2 2 are bent inward at an angle to form one side of the spoke-head, and the body of the spoke 6 is bent up at its edges 7 7 throughout the length of the spoke. 8 indicates the spoke-blank after the third operation, in which operation the sides of the head have been closed in and a hollow rectangular head 9 in cross-section produced and the body 10 of the spoke formed. 11 indicates the blank after the fourth operation has been performed—namely, cutting the V-shaped opening 12 in two opposite walls of the head and cutting out the metal on one side to form the curved opening 13, to allow the metal on said sides to be crowded down in forming the transverse semicircular seat for the retaining-bolt in constructing or assembling a wheel. 14 indicates the blank after the fifth operation, in which the transverse semicircular depression or seat 15, having a continuous wall 15' between the faces or straight sides of the spoke and forming the bottom of the depression, has been formed. The head of the spoke is then placed in a suitable die and the sides 16 16 of Fig. 6 and Fig. 6ª forced in toward each other to form the wedge-shaped head 17. (Shown in Figs. 7 and 7ª.)

In assembling the spokes for a wheel the transverse seats 15 are placed adjacent to each other, as shown, and thus form a circular wall or seat for a bolt, whereby one bolt serves to secure two spokes and the thimble heretofore used dispensed with without sacrificing any strength of the spoke, as the wall of the transverse seat forms a transverse reinforce for the head of the spoke.

By this construction one-half the bolts now used to secure the spokes in a hub are saved in the manufacture of wheels without sacrificing the strength of the wheel.

In assembling the spokes for a wheel the heads are placed in position between the members forming the hub of the wheel, the outer ends of the spokes inserted in the rim of the wheel, the whole properly secured together and dipped or immersed in a bath of molten metal and all the parts metallically joined together, after which the wheel is finished in the usual manner.

Having thus fully described my invention, what I claim is—

1. A tubular metallic wheel-spoke having a wedge-shaped head, flat on two of its sides, and one of the inclined sides provided with a transverse depression having a wall between said flat sides of the spoke and forming the bottom of the depression.

2. A tubular metallic wheel-spoke having a head provided with a transverse semitubular depression having a wall between and joining the opposite faces or flat sides of the spoke, and forming the bottom of the depression.

3. Tubular metallic wheel-spokes provided with transverse depressions having a continuous wall between the flat sides of the spokes and in their adjacent inclined sides, forming a reinforce for the spokes and a seat for a bolt to be inserted between adjacent spokes.

In testimony whereof I affix my signature in presence of two witnesses.

THOMAS MIDGLEY.

Witnesses:
FRED MIDGLEY,
PARNELL CULL.